*INVENTORS.*
AVARD F. FAIRBANKS
CHARLES M. WOLFE

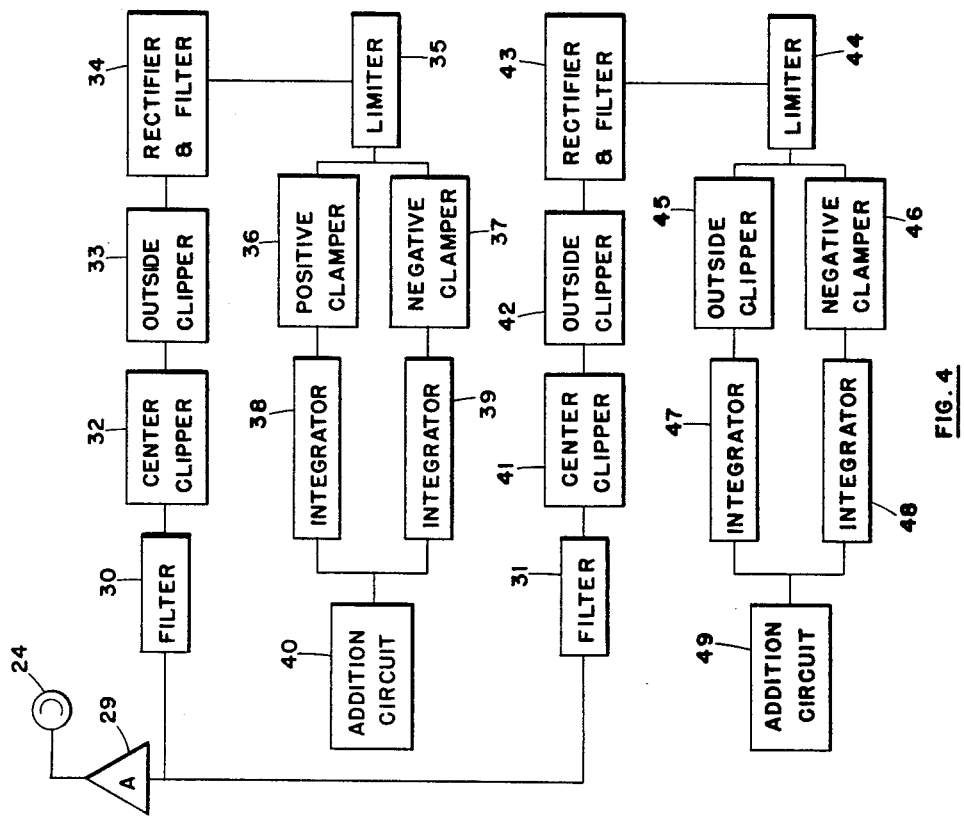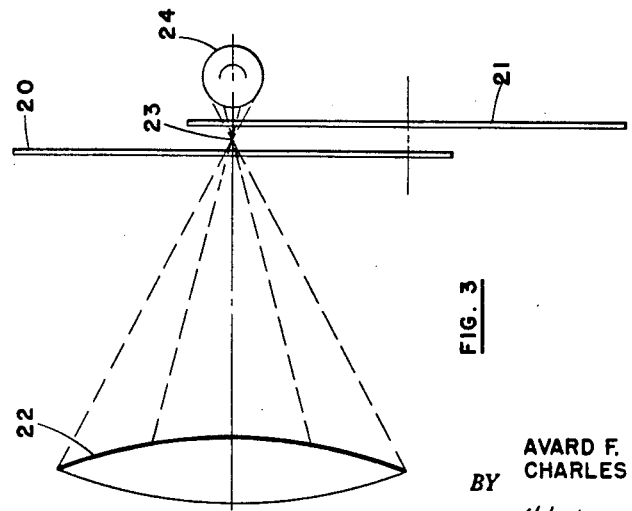

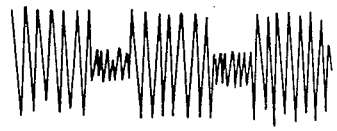
FIG. 5
FIG. 6
FIG. 7
FIG. 8
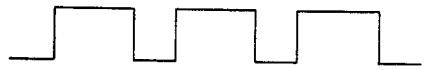
FIG. 9
 
FIG. 10     FIG. 12
 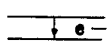
FIG. 11     FIG. 13
↕ ERROR VOLTAGE
FIG. 14
INVENTORS.
AVARD F. FAIRBANKS
CHARLES M. WOLFE
BY William P Lane
ATTORNEY United States Patent Office 3,004,169
Patented Oct. 10, 1961

3,004,169
RADIATION DETECTING SYSTEM
Avard F. Fairbanks, South San Gabriel, and Charles M. Wolfe, Glendora, Calif., assignors to North American Aviation, Inc.
Filed Nov. 2, 1953, Ser. No. 389,562
8 Claims. (Cl. 250—233)

This invention pertains to means for detecting the direction of a radiation source, or the direction of an object which blocks the passage of radiation in the presence of a substantially uniform background radiation: for example, an aircraft passing across a substantially uniform background sky.

Prior known radiation detecting devices require a reference signal voltage source, generate a signal which decreases in magnitude as the image of the radiation source approaches the center of the field of view of the instrument, or modulate the background light radiation in a manner which increases the difficulties of eliminating the signals caused thereby.

The device of this invention contemplates the use of two scanning reticles each of which has a modulation pattern that modulates a point of radiation, or a point of nonradiation, at a different frequency than the other reticle. The motions of the two reticles within the field of view of the radiation collecting system are orthogonal to each other. Two signals are generated, each at a different frequency, within the radiation sensing device. The two signals are then separated by electrical filter means. The filtered signals pass through electronic means which are adapted to generate signals which are a function of the position of the image of the radiation source to be detected upon the focal plane of the radiation collecting system.

It is therefore an object of this invention to provide improved radiation detecting means.

It is another object of this invention to provide improved means for detecting the direction of a radiation source.

It is still another object of this invention to provide improved means for detecting the position and direction of a nonradiating body in the presence of substantially uniform background radiation.

It is still another object of this invention to provide improved reticle scanning means for use in a radiation detector.

It is another object of this invention to provide a novel reticle for use in radiation scanning.

It is another object of this invention to provide an improved means for detecting the direction of an infrared radiation source.

Other objects of invention will become apparent from the following description taken in connection with the accompanying drawings, in which FIG. 1 is a drawing of one embodiment of the improved reticle scanner of this invention;

FIG. 3 is a schematic diagram of the optical radiation collecting system together with the reticle scanner and radiation detecting device of this invention;

FIG. 4 is a block diagram of a preferred embodiment of the electrical portion of the device of this invention;

FIG. 5 is a graph of the voltage output of the first amplifier and filter of one channel of the electrical portion of this invention;

FIG. 6 is a graph of the voltage output from the center clipper of the electrical portion of this invention;

FIG. 7 is a graph of the voltage output from the outside clipper of the electrical portion of this invention;

FIG. 8 is a graph of the voltage output from the rectifier filter of the electrical portion of this invention;

FIG. 9 is a graph of the electrical output from the peak limiter of the electrical portion of this invention;

FIG. 10 is a graph of the voltage output from the positive clamper of the device of this invention;

FIG. 11 is a graph of the voltage output from the negative clamper of the device of this invention;

FIG. 12 shows the height of the direct current voltage from the output of the positive integrator of the electrical portion of this invention;

FIG. 13 shows the height of the voltage output from the negtaive integrator of the device of this invention;

And FIG. 14 shows the resultant error voltage magnitude from the output of the error voltage adding circuit of this invention.

Figure 1:
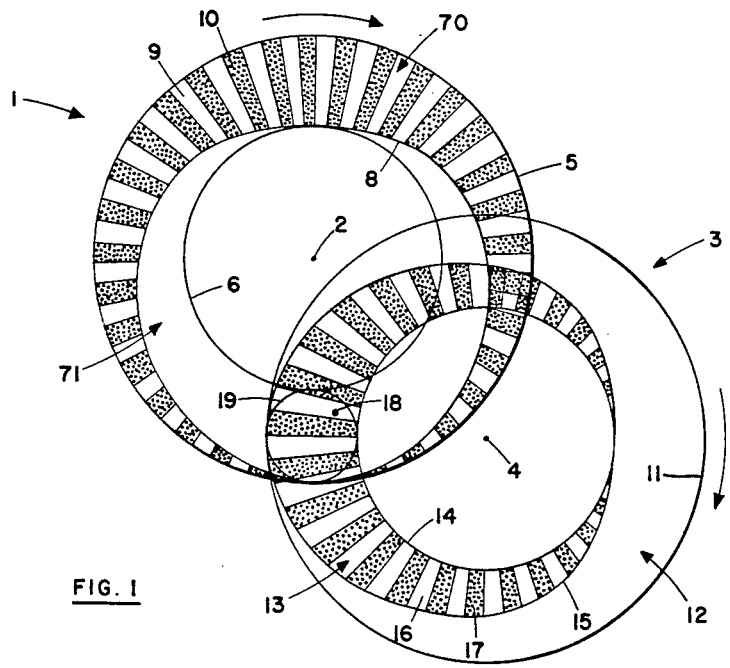

Reticle 1 is mounted to rotate about axis 2; reticle 3 is mounted to rotate about axis 4. The operative portion of reticle 1 is between curves 5 and 6 and is substantially an annulus divided into two major portions or areas 70 and 71. Area 70 is bounded by circle 5 and curve 8. While curve 8 may be any function of an arbitrary angle measured about axis 2, for example a circle eccentric with axis 2, it is preferably of a shape to make the radial distance between circle 5 and curve 8, measured from axis 2, a linear function of the angle measured about axis 2. The space between circle 5 and curve 8 is divided into alternately transparent and opaque portions whose boundaries are upon radii of circle 5. Transparent and opaque portions 9 and 10, respectively, are uniformly circumferentially distributed about axis 2. That is to say, the width of each transparent segment 9 and each opaque segment 10 subtends an equal angle measured about axis 2. Reticle 1 is positioned with respect to field of view 19, of the optical system to be presently described, to cause reticle 1 to modulate the light within field of view 19 in a direction from right to left in FIG. 1. The portion of optical field 19 which is modulated by area 70 is continually varying in a direction from top to bottom or bottom to top in FIG. 1. The operational portion of reticle 3 is divided into two major portions or areas 12 and 13. These areas are between circles 11 and 14 to form an annulus whose center is at 4. Area 12 is bounded by circle 11 and curve 15 while area 13 is bounded by circle 14 and curve 15. Curve 15 may be an arbitrary function of an angle measured about axis 4, but is preferably a curve which is defined so that the radial distance between circle 14 and curve 15, measured from axis 4, is a linear function of the angle measured about axis 4. Area 13 is uniformly circumferentially divided into alternately opaque and transparent portions. That is to say the width of transparent portions 16 and opaque portions 17 subtends equal angles measured about axis 4. The boundary between adjacent transparent and opaque portions is upon a radius of circle 11 whose center is upon axis 4. The alternately transparent and opaque portions 16 and 17 are adapted to modulate optical field 19 in a direction from top to bottom or bottom to top in FIG. 1 while the amount or portion of optical field 19 which is modulated thereby is continuously varying in a direction from left to right or right to left. Reticles 1 and 3 are designed so that the alternately transparent and opaque portions 9 and 10 intercept the image of a radiation source shown at 18 at a different frequency than the alternately transparent and opaque portions 16 and 17. Thus, when the scanning system of this invention is designed so that reticles 1 and 3 turn at the same angular velocity, area 70 must have a different number of alternately transparent and opaque portions 9 and 10 than does area 13 of reticle 3. If the number of transparent and opaque portions 9 and 10 are equal to the number of transparent and opaque portions 16 and 17, reticle 1 must rotate at a different angular velocity than reticle 3. The frequency at which image 18 is modulated by reticle 1 is preferably separated an appreciable amount from the frequency at which image 18 is modulated by reticle 3. It is also preferable that the modulating frequency of reticle 1 is not a multiple of the modulating frequency of reticle 3, or that the frequency of scan or modulating frequency of reticle 3 is not a multiple of the frequency of scan of reticle 1.

In the preferred embodiment of this invention, reticles 1 and 3 rotate at the same angular velocity. It is also preferable that the pattern of reticle 1 be positioned with respect to the pattern of reticle 2 as shown, that is, that the patterns are 90° apart so that no part of area 70 is intercepting field of view 19 when the maximum amount of interception occurs with portion 13 or reticle 3. This may be accomplished by means of a simple gear train positioned between reticle 1 and reticle 3 which mechanically positions and maintains area 70 with the proper orientation relative to area 13.

Figure 2:
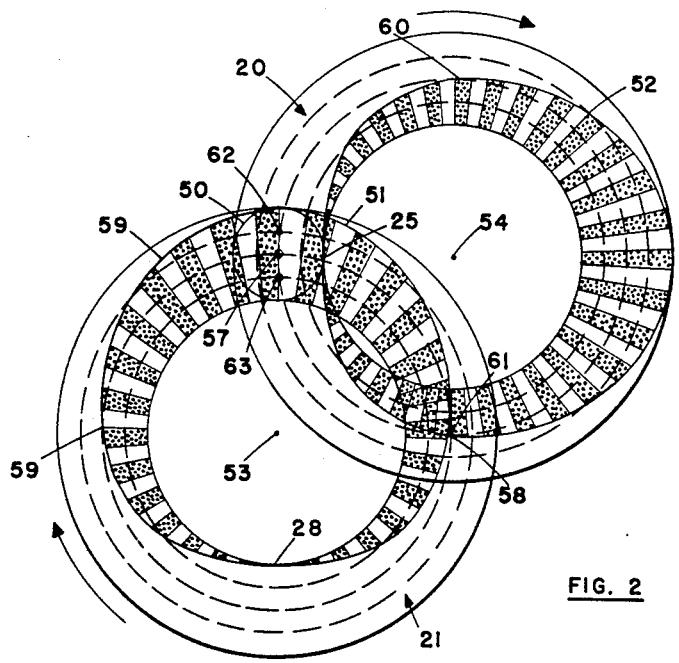
FIG. 2 is a second embodiment of the reticle scanning system of this invention.

Reticles 20 and 21 of FIG. 2 are identical in structure with reticle 3 except that the number of alternately light and dark portions of reticles 20 and 21 are, between themselves, of a different number.

In FIG. 3 optical radiation collecting device 22 focuses the image of the radiation source upon the focal plane substantially at point 23. Reticles 20 and 21 are as thin as possible so that they can be placed without touching next to each other substantially upon the focal plane. Reticles 20 and 21 should not be so thin that they cannot withstand the mechanical stresses caused by their rotation. Radiation detecting device 24 collects all of the radiation that passes through both reticles 20 and 21.

As shown in FIG. 4, radiation detecting device 24 has an electrical output which is connected to the input of amplifier 29. The output of amplifier 29 is connected to the inputs of filters 30 and 31. The electrical output of filter 30 is connected to the input of center clipper 32. The output of center clipper 32 is connected to the input of outside clipper 33. The output of outside clipper 33 is connected to the input of rectifier-filter 34. The output of rectifier-filter 34 is connected to the input of limiter 35. The output of limiter 35 is connected to the input of positive clamper 36 and negative clamper 37. The output of positive clamper 36 is connected to the input of integrator 38. The output of negative clamper 37 is connected to the input of integrator 39. The outputs of integrators 38 and 39 are connected to the input of addition circuit 40. The output of filter 31 is connected to the input of center clipper 41. The output of center clipper 41 is connected to the input of outside clipper 42. The output of outside clipper 42 is connected to the input of rectifier-filter 43. The output of rectifier-filter 43 is connected to the input of limiter 44. The output of limiter 44 is connected to the inputs of positive clamper 45 and negative clamper 46. The output of positive clamper 45 is connected to the input of integrator 47. The output of negative clamper 46 is connected to the input of integrator 48. The outputs of integrators 47 and 48 are connected to the input of addition circuit 49.

In operation the radiation to be detected is focused upon the plane of focal point 23 of optical lens system 22.

The planes of reticles 20 and 21 are substantially upon the plane of focal point 23. For purposes of explanation the reticle pattern shown in FIG. 2 will be used, and curves 51 and 52 will be considered to have radial distances from axes of rotation 53 and 54, respectively, which are proportional to the angle through which reticles 20 and 21 have turned from points 25 and 28 respectively. The image of a radiation source and the image of a body which does not radiate in the presence of uniform radiation will be used interchangeably herein to explain the operation of the device of this invention. When the image of a radiation source is positioned within field of view 50, shown at point 57, the image is intercepted by curve 51 at point 58 and is again intersected by curve 51 at point 59. Curve 52 will first intersect image 57 at point 60 and will again intercept curve 52 at point 61. Because point 57 is in the center of field of view 50, the time duration between the interception of image 57 by points 58 and 59 will be equal to the time duration of the interception of image 57 by points 60 and 61. Because reticle 20 has a different number of transparent and opaque spaces than reticle 21, a different carrier frequency signal is generated by the interception of the transparent and opaque spaces of reticle 20 than is generated by the interception of the transparent and opaque spaces of reticle 21 of image 57. If the image of the radiation source were at point 62, the time duration between the consecutive interceptions of image 62 by curve 51 would be decreased while the time duration between the interception of image 62 by curve 52 would be substantially the same as it was at point 57, provided the radius of reticles 20 and 21 is considerably larger than the radius of field of view 50. When the image of the radiation source is at point 63, the time duration between the consecutive interceptions of image 63 by curve 58 is increased beyond the time duration between consecutive intersections at point 57, while the time duration between consecutive intersections of curve 52 is substantially the same as that at 57. Hence, it follows that the time duration between the beginning and end of the signal which is modulated at the frequency of reticle 21 is a measure of the distance up and down, within field of view 50, while the time duration of the signal modulated at the frequency of reticle 20 is a measure of the distance right and left of the image of the radiation source within field of view 50. The signal generated by reticles 20 and 21 is detected by radiation detecting device 24. The signal is next amplified by means of amplifier 29, as shown in FIG. 4. Filter 30 is tuned to pass only the frequency of the signal generated by reticle 21. Filter 31 is tuned to pass only the frequency of the signal generated by reticle 20. Elements 41, 42, 43, 44, 45, 46, 47, 48 and 49 are identical to elements 32, 33, 34, 35, 36, 37, 38, 39 and 40, respectively.

A graph of the voltage output of filter 30 is shown in FIG. 5. Some noise is present and must be removed. Center clipper 32 removes the center portion of the signal so that the resultant output thereof shows only the peaks of FIG. 5 shown at FIG. 6. Outside clipper 33 then clips the peaks of the signal output from center clipper 32 so that a signal which has a uniform amplitude and which has a time duration that depends upon the time duration of the modulation by alternately transparent and opaque spaces of reticle 21 is obtained. A graph of this voltage is shown in FIG. 7. The voltage from outside clipper 33 is then rectified and partially filtered by rectifier-filter 34 so that its voltage envelope is substantially as shown in FIG. 8. The amplitude of the voltage is then limited by limiter 35 to remove the ripple so that the output of limiter 35 has a voltage envelope which is substantially as shown in FIG. 9. The output of limiter 35 is connected to the input of positive clamper 36 and negative clamper 37. Clampers 36 and 37 are connected to clamp one side or the other of the envelope shown in FIG. 9 to zero potential as shown in FIGS. 10 and 11. The output of positive clamper 36 is then integrated by integrator 38 to create a positive voltage, shown in FIG. 12, which is proportional to the area under the curves of FIG. 10, and hence is proportional to the time duration between the interception of the image of the radiation source by the boundary curves of the transparent and opaque portions of reticle 21. The output of negative clamper 37 is integrated by integrator 39 to create a negative voltage, shown in FIG. 13, which is proportional to the time duration when the image of the radiation source is not intercepted by the alternately transparent and opaque portions of reticle 21. The outputs of integrators 38 and 39 are connected to addition circuit 40 where their voltages, shown in FIGS. 12 and 13, are algebraically added to create an error voltage, shown in FIG. 14. The error voltage is proportional to the deviation of the image of the radiation source from point 57, in FIG. 2, in a direction toward point 62 or toward point 63. In the event that the error voltage is positive, the error voltage is proportional to the deviation of the image from point 57 in the direction of point 63. In the event that the error voltage is negative, the error voltage is proportional to the deviation of the radiation source from point 57 in the direction of point 62.

The output voltage from addition circuit 40 can be connected to a servo system (not shown) to cause the optical system of lens 57 to follow the source of radiation to cause the image of the radiation to remain substantially at point 57. In addition, the error signal can be used to control other devices such as gun directors, etc.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for locating a source of radiation in an optical field or a point of no radiation in the presence of substantially uniform radiation comprising a light collecting system having a focal plane, a pair of rotating reticles each having alternately transparent and opaque portions of continuously varying radial length, uniformly circumferentially disposed about their axes and positioned thereon to intercept a continuously varying portion of the field of said optical system in a particular direction, said first reticle adapted to move in a direction orthogonal to the direction said second reticle is adapted to move, the axis of said reticles being disposed with respect to the field of view of said optical system to cause said alternately transparent and opaque portions to scan said field of view in orthogonal directions, a radiation detecting device positioned behind said reticles to receive the modulated light therethrough, a first frequency sensitive electronic system sensitive to the modulation frequency of scan of said first reticle to create a signal which is a known function of the coordinate of said source of radiation in said first direction, and a second frequency sensitive electronic system sensitive to the scan frequency of said second reticle to generate a signal which is a known function of the position of said source of radiation in said optical field in said second direction.

2. A device as recited in claim 1 in which said frequency sensitive electronic system each comprises in series attached to the output of said radiation sensitive device means for filtering center clipping, outside clipping, rectifying, limiting, clamping, integrating, and adding the electrical signal from said radiation sensitive device.

3. An annular reticle having a transparent first area and a second area comprising alternately opaque and transparent portions uniformly circumferentially disposed about the center of said annulus, the boundary between said transparent area and said second area being radially positioned from the center of said annulus by a distance which is a linear function of an angle measured about said center.

4. A pair of annular reticles which are adapted to be rotated about the centers thereof, each said reticle comprising a transparent portion and an alternately transparent and opaque pattern, said alternately transparent and opaque pattern being uniformly circumferentially disposed about said center, the boundary between said transparent area and said alternately transparent opaque pattern being a predetermined function of an angle measured about said center, said centers being disposed with respect to each other to cause said alternately transparent and opaque pattern of one said reticle to move in a direction orthogonal to the direction of movement of said transparent and opaque pattern of said second reticle.

5. A pair of transparent annular reticles including an opaque pattern thereon which are adapted to be rotated about the centers thereof, each said reticle having an opaque pattern thereon whose outside radius is a circle and whose inside radius is a linear function of an angle measured about said center, said pattern comprising alternately opaque and transparent portions uniformly circumferentially disposed about the center of said annulus, said centers being disposed with respect to each other to cause said alternately transparent and opaque pattern of one said reticle to be constrained to move only in a direction orthogonal to the direction of movement of said transparent and opaque pattern of said second reticle.

6. A pair of annular transparent reticles including an opaque pattern thereon which are adapted to be rotated about the centers thereof, each said reticle having an opaque pattern thereon whose inside radius is a circle and whose outside radius is a linear function of an angle measured about said center, said pattern comprising alternately opaque and transparent portions uniformly circumferentially disposed about the center of said annulus, said centers being disposed with respect to each other to cause said alternately transparent and opaque pattern of one said reticle to be constrained to move only in a direction orthogonal to the direction of movement of said transparent and opaque pattern of said second reticle.

7. A pair of transparent annular reticles adapted to be rotated about the centers thereof, said first reticle having an opaque pattern thereon whose outside radius is a circle and whose inside radius is a linear function of an angle measured about said center, said opaque pattern comprising alternately opaque and transparent portions uniformly circumferentially disposed about the center of said annulus, said second reticle having an opaque pattern thereon which has a circular inside radius and an outside radius which is a linear function of an angle measured about the center of said reticle, said opaque pattern comprising alternately opaque and transparent portions uniformly circumferentially disposed about the center of said annulus, said centers being disposed with respect to each other to cause said alternately transparent and opaque pattern of one said reticle to be constrained to move only in a direction orthogonal to the direction of movement of said transparent and opaque pattern of said second reticle.

8. Means for locating a source of radiation in an optical field or a point of no radiation in the presence of substantially uniform radiation comprising first means for modulating at a first frequency the radiation of a portion of said field which extends across said field in a first direction, said first means including radiation chopping means and means for moving said chopping means across said field in said first direction, said first means including means for continuously varying the dimension of said radiation modulated field portion in a second direction which is angularly related to said first direction, second means for modulating at a second frequency the radiation of a second portion of said field which extends across said field in said second direction, said second means including second radiation chopping means and means for moving said second chopping means across said field in said second direction, said second means including means for continuously varying the dimension of said second radiation modulated field portion in said first direction, and means responsive to said modulated radiation for producing electrical signals proportional to displacement of said source along axes defined by said first and second directions respectively to thereby locate said source of radiation in said field.

References Cited in the file of this patent
UNITED STATES PATENTS
2,604,528     Obermaier _____ July 2, 1952